United States Patent
Erb et al.

(10) Patent No.: US 7,599,943 B2
(45) Date of Patent: *Oct. 6, 2009

(54) SYSTEM FOR ACQUIRING RIGHTS TO LEASE A DRILLING RIG

(75) Inventors: Kim Robert Erb, Houston, TX (US); Robert Richard Steven, Harleston (GB)

(73) Assignee: ODS-Petrodata, Inc., Houston, TX (US)

(*) Notice: Subject to any disclaimer, the term of this patent is extended or adjusted under 35 U.S.C. 154(b) by 828 days.

This patent is subject to a terminal disclaimer.

(21) Appl. No.: 11/257,679

(22) Filed: Oct. 25, 2005

(65) Prior Publication Data

US 2007/0094105 A1 Apr. 26, 2007

(51) Int. Cl.
*G06F 17/00* (2006.01)
*G06Q 10/00* (2006.01)

(52) U.S. Cl. .................... 707/100; 705/27; 705/29; 707/104.1; 709/219

(58) Field of Classification Search .............. 705/1, 705/26–29; 707/10, 100, 104.1; 709/217, 709/219, 223, 226; 718/101, 106; 719/316
See application file for complete search history.

(56) References Cited

U.S. PATENT DOCUMENTS

| | | | |
|---|---|---|---|
| 6,612,382 B2 * | 9/2003 | King ........................ 175/40 |
| 6,879,962 B1 * | 4/2005 | Smith et al. ................ 705/22 |
| 7,096,223 B2 * | 8/2006 | Cope ......................... 707/100 |
| 7,231,590 B2 * | 6/2007 | Abbar et al. ............... 715/255 |
| 7,257,594 B2 * | 8/2007 | Tamboli et al. ............ 707/101 |
| 7,286,959 B2 * | 10/2007 | Steinke ..................... 702/182 |
| 7,293,029 B2 * | 11/2007 | Cope ......................... 707/100 |
| 7,430,529 B2 * | 9/2008 | Erb et al. ................... 705/27 |
| 7,448,046 B2 * | 11/2008 | Navani et al. ............. 719/316 |
| 7,536,394 B1 * | 5/2009 | Gryparis .................... 707/100 |
| 2005/0177789 A1 | 8/2005 | Abbar ........................ 715/528 |

* cited by examiner

*Primary Examiner*—Andrew Joseph Rudy
(74) *Attorney, Agent, or Firm*—Buskop Law Group, PC; Wendy Buskop

(57) ABSTRACT

A system for acquiring rights to lease a drilling rig for periods of time and/or particular activities and including leassee client devices, leassor client devices, and a database server system is disclosed. The leassee client devices and leassor client devices communicate with the database server system. The database server system maintains a catalog of drilling rigs available to potential leassees via their respective client devices, comprising information on the drilling rigs available for lease. The database server maintains information on leassors with drilling rigs for lease and information on equipment used on drilling rigs for lease. The system allows leassees and leassors to request bids, formulate potential leassor distribution lists, and determine the best leasing conditions offered by the leassors. The system facilitates making an award to the potential leassor, which offers the best leasing conditions for the lease of a drilling rig most closely matching the formulated bid request.

20 Claims, 6 Drawing Sheets

SYSTEM FOR ACQUIRING RIGHTS TO LEASE A DRILLING RIG

FIELD

The present embodiments relate to systems for acquiring rights to lease a drilling rig.

BACKGROUND

Traditionally, leases of drilling rigs involve a leassor creating a lease agreement with a leassee. In creating the lease relationship and lease agreement, the prospective leassee will generally require information regarding the drilling rig from the leassor. At times, leassors may lack the time or expertise to fully monitor the condition of their drilling rigs with precision and regularity thereby creating an inability for them to thoroughly inform the leassees of information that they require.

Some leassors turn to management companies. However, these companies can be expensive, and there are no assurances that the rent will be paid to the leassor when it is due. Additionally, these property management companies can lack the resources and expertise to provide the requisite information that a potential leassee requires before leasing a drilling rig.

Accordingly, there exists a need for a system for acquiring rights to lease drilling rigs for a specified period of time or a particular activity.

A potential leassee and leassor will normally require certain information before actually leasing a drilling rig, such as the availability of drilling rigs to potential leassees, the technical specifications of the drilling rig, the number of bid requests a potential leassee can have, contract terms of the lease, the different types of rates offered by the leassor, and the different types of responsibilities the leassee and leassor can incur. The enormous amount of information that needs to transfer between the potential leassee and leassor increases the probability of delaying, misplacing, or forgetting a piece of information that can be vital to either party.

Thus, a need exists for a system that can provide for a plurality of potential leassees to obtain information regarding a plurality of drilling rigs. A need exists for a system that can provide for a plurality of leassors to obtain information regarding the potential leassees that wish to lease drilling rigs. Further, a need exists for a database server system to interface the needs of the potential leassee and the leassor in a manageable fashion.

The present embodiments meet these needs.

BRIEF DESCRIPTION OF THE DRAWINGS

The detailed description will be better understood in conjunction with the accompanying drawings as follows.

Figure 1:
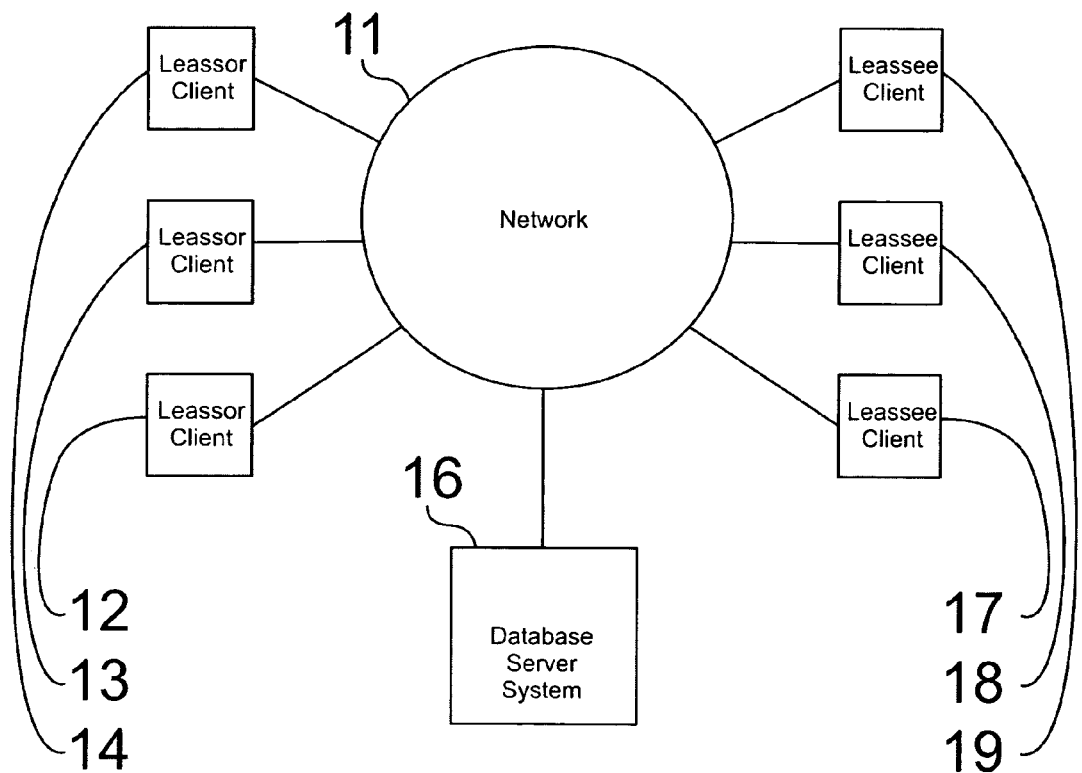
FIG. 1 depicts a diagram of a network system for acquiring rights to lease a drilling rig.

The present embodiments are detailed below with reference to the listed Figures.

DETAILED DESCRIPTION OF THE EMBODIMENTS

Before explaining the embodiments in detail, it is to be understood that the invention is not limited to the particular embodiments and that the invention can be practiced or carried out in various ways.

The present embodiments are for a system for acquiring rights to lease a drilling rig, such as for a period of time or a particular activity, such as drilling an oil well.

The system can be a network system which enables one or more leassees and leassors to connect to a secure server via a network using one or more leassee client devices and one or more leassor client devices. For example, a MicroSoft SQL server can be used as the secure server and the network can be: an Internet, a wide area network (WAN), a local area network (LAN), an Intranet, or a subscriber network. The system contemplates that the network can be a standard network or a fiber-optic network. The leassee client devices and the leassor client devices can use passwords and identification codes, or other types of code, such as a biometric identifier, to permit secure and authenticated access to the secure server of the database server system. For example, a user can transmit an encrypted password to a secure server. Then, the secure server can authenticate the user's identification and level of permitted access. Subsequently, the secure server can permit access of the authenticated user, which can be a potential leassee, an existing leassee, a leassor, or a potential leassor.

The database server system includes a processor with associated memory, a database storage in communication with the processor, and I/O ports in communication with the processor for communication with a network. The processor can be a commercially available AMD or Intel or an equivalent. The database storage can be centralized or a distributed database storage system, which uses multiple storage devices having available, for example, 40 gigabytes of memory.

The database storage maintains information on drilling rigs, for example: rig name, drilling rig capabilities, types of moorings, the water depth that the drilling rig can be placed in if the rig is a movable rig, the water depth if the rig is a fixed rig, and rig owner information. The rig owner information can include: rig owner address, contact people, maintenance history and so on. The database storage includes: information on equipment used on the drilling rigs that are identified, which can include blow out preventors (BOP), tubing hangers, draw works details, numbers and types of mud pumps, horsepower of mud pumps, cranes on the rigs, accumulators used on the rig, dynamic positioning systems and other acoustic beacons or other locating devices for detecting subset wells, pipe handling equipment, pipe make-up equipment, ceiling height, topdrive systems, pipe rack capacity, and other similar equipment on a drilling rig. The database storage system includes information on leassors with drilling rigs, which information includes: individual contact information, leassor company name, contacts within the company, regional information, contact address, phone numbers, fax numbers, and email addresses. The database storage system includes information on bid requests such as line item pricing; dates of execution of a bid; maintenance costs per day, or by project, or by type of equipment; and other bid matters relative to daily costs. The database storage includes information on tender offers for drilling rig leases and information on the awards that were made based on the tender offers, as well. Tender offer information can include the offered rig's technical specifications and requirements, deficient equipment, and tender offer qualifications, which can include contract exceptions; Quality, Safety, Health, and Environment (QHSE) exceptions; insurance requirements; a schedule of responsibilities, and commercial rates.

Operationally, the database server system includes computer instructions on computer readable media enabling potential leassees to specify technical requirements for a desired drilling rig using a leassee client device. These technical requirements can include: operating constraints, maximum rig weight, hoisting equipment needed for a rig assembly, drill bit specifications, and rotary inputs. The system includes computer instructions for formulating a leassor distribution list by the potential leassee to receive an invitation to tender an offer. For example, the leassor distribution lists can include: a global marketing manager, a regional specific marketing manager, a country specific marketing manager, a rig specific marketing manager, a deep water marketing manager, a shallow water marketing manager, an international marketing manager, and a domestic marketing manager.

To formulate the list of potential leassors to receive an invitation to bid, a user can select from a list of drilling rigs which have a list of leassors associated with them. These leassors can be users of the database server system, or they can be listed leassors in the server system, which are not authenticated users of the system. A potential leassee can select rigs of interest and create a list with addresses and emails for contacting leassors of those selected rigs. The leassee provides the leassors with a bid request developed by the leassee. The bid request can include, among other things, the technical specifications for the drilling rig to be leased. In addition, the database server system has computer instructions for formulating a bid request and transmitting the bid request to each leassor on the leassor distribution list via their respective leassor client devices. These computer instructions involve communications, displays of selections and options to the potential leassee on the leassee client device from the database server system. The computer instructions involve communication, back and forth between the client device and the server system to be used in the identification of the technical requirements and the rigs, for the development of the leassor distribution list and for the invitation to respond to the bid proposal.

Once a bid proposal is created by the leassee, computer instructions in the database server system enable leassors to use their respective leassor client devices to tender offers regarding the lease of drilling rigs, related to the bid request, back to the potential leassee. These tender offers are tracked from the leassor client device, through the secure server of the database server system, to the leassee. The tender offer can also be captured in the data storage of the database server system with additional computer instructions. The tender offers can be tracked by a leassor, a leassee, or an administrator of the system. In one embodiment, the tender offers can be tracked by date of uploading and date of downloading.

Other computer instructions resident within the database server system enable leassees to determine the best leasing conditions offered by the leassors, and to award a contract to a leassor which offers the best leasing conditions that most closely matches the bid request. The computer instructions also enable the saving into database storage of the information on the contract awarded, (termed "the award" herein). For example, the best leasing conditions can be determined by best commercial fit, technical fit, and rig availability based on the tender requirements.

The leassor client devices and leassee client devices can be computers. These devices can be personal digital assistants (PDA), cellular phones with display and processing capabilities, laptops, Blackberrys™, interactive television devices, and similar interactive devices with display, two way transmissions, connectivity to the network, and processing capability. A satellite phone or similar communication tool adapted to communicate with the World Wide Web can be used. The database server system can be in communication with these leassor client devices and leassee client devices via the World Wide Web, but the server system can interact with these devices though a wide area network (WAN), a local area network (LAN), or through a subscriber network as well.

The database server system also maintains a network accessible secure qualifications bulletin board. This network accessible secure qualifications bulletin board enables potential leassors to provide information to a leassee and receive information from a leassee with their respective leassor client devices in an open format. Examples of information received from the leassee include bid document alternatives, leassee bid document exceptions, or combinations thereof. In addition, the secure qualifications bulletin board can be used by leassors or leassees for clarifications of bid documents, requests for additional information on a bid proposal, or combinations thereof.

The network accessible secure qualifications bulletin board can be on a second database server connected to the database server system, or it can be resident on one server housing the database storage, the processor, and the bulletin board. Alternatively, the server system with bulletin board can be located, in part, on a plurality of servers. The secure qualification bulletin board provides one-to-one communication while a secure information bulletin board provides one-to-one or one-to-many communication. The details of the secure qualifications bulletin board and the secure information bulletin board are provided in FIGS. 5 and 6, respectively A reporting and data storage module can be used with the database system and is resident on the initial server or another server in communication with the processor of the database storage system.

The reporting and data storage module acts to store information which is developed in the communications of the database storage system. The reporting and data storage module can store initial bid requests, as well as communications on clarifications to the bid process. This module can be used for storage and to provide reports on negotiation communications occurring during the bid process as well as for storing final bid requests; subsequent, initial, and final tender offers; and summaries of a leassee's selection process for a drilling rig. The reporting and data storage module can contain computer instructions to perform one or more of the tasks in communication with the processor.

The report from the data storage module can include, for example: commercial summaries outlined by issues or by rig comparisons, technical summaries outlined by specifications or by rig comparisons, evaluation histories, tender details, submission status, proposal status, and information captured by the bulletin boards.

For example, the secure qualifications bulletin board can include information for private negotiation and agreement of contract qualifications, such as: a list of operators with drilling rig operations and corresponding existing and previous contract descriptions, type of rig equipment by operator, location of drilling rig operations or sites by operator and contract, and other tender information.

The secure information bulletin board can include information for public or private clarification of tender-related issues, such as: clarification of the operator for a type of drilling rig operation, clarification on contract description for an operator of a drilling rig operation, clarification on rig type equipment and water depth, clarification on location of drilling rig operation for a particular operator, and additional tender information.

The bid request can communicate or link to a secure rig website so that potential leassors can determine if there is interest in the bid and permit potential leassors to download information for their review. A bid request can be for one rig, or for a group of drilling rigs.

The database server system can be programmed and designed to permit a potential leassee to select operating rates that are of interest for the rig to be leased. Indicated operating rates can be addressed by the leassor for drilling rig operations. Examples of selected operating rates, include: day rates, such as $100,000 per day for the rig called Amirante; mobilization lump sum rates, such as $2,000,000 to relocate a Gulf of Mexico rig to West Africa; demobilization lump sum rates, such as $1,000,000 to return the West Africa rig to the Gulf of Mexico; and deficient/additional equipment lump sum rates, such as $3,000,000 to meet minimum specifications. Examples of day rates can include: operating rates, standby rates, force majeure rates, waiting on weather rates, repair rates, lump sum rates, and combinations thereof.

The database server system is contemplated to have computer instructions which permit a leassor to indicate a list of deficient equipment on a rig to keep a potential leassee apprised. Deficient equipment can include accommodation upgrades for a rig, pipe handling equipment upgrades, an addition of a topdrive, and similar equipment.

The database server system can have computer instructions to permit a potential leassee to select a number of other elements to go into a bid proposal, such as insurance requirements required by the leassor for drilling rig operations, contract terms and conditions of a drilling contract, safety requirements for drilling rig operations, and a schedule of responsibilities between leassor and leassee for drilling rig operations.

The leassee can create a bid proposal which requests a tender offer on a turnkey basis. The bid proposal can address a rig owned or controlled by a group of leassors, or the proposal can address a group of rigs controlled by one leassor controlled by a group of leassors.

The tender offer is made by the leassor based on the bid proposal and negotiations concerning various terms of the bid proposal.

The database server system enables potential leassees to use their respective leassee client devices to make joint bid proposals, and enables leassors to make joint tender offers. Joint tender offers can be made by partners of a lease, partners of a field, or other consortia.

The database server system can include computer instructions, whereby a leassee has a specified time period for leassor to reply to a tender offer, such as a week or a month.

The database server system can include computer instructions to edit or modify the distribution list for the invitation to bid; technical specifications for a bid; the initial or final bid requests; if there are more than one bid request, then any and all responses to bid requests; and initial and final tender offers if there are negotiations and revisions.

Computer instructions to create the contract award can also be resident on the database server system as an artificial intelligence program or as a fill-in-the-blank award contract, that can be displayed on a client device of a leassee and, then, transmitted to the leassor to be stored in the data storage of the database server system.

With reference to the figures, FIG. 1 depicts a network (11) in communication with leassor client devices (12), (13) and (14), a database server system (16), and leassee client devices (17), (18) and (19). The network is the Internet, and the client devices can be a combination of computers and PDA's such as a Palm Pilot™ or a Dell PC computer.

Figure 2:
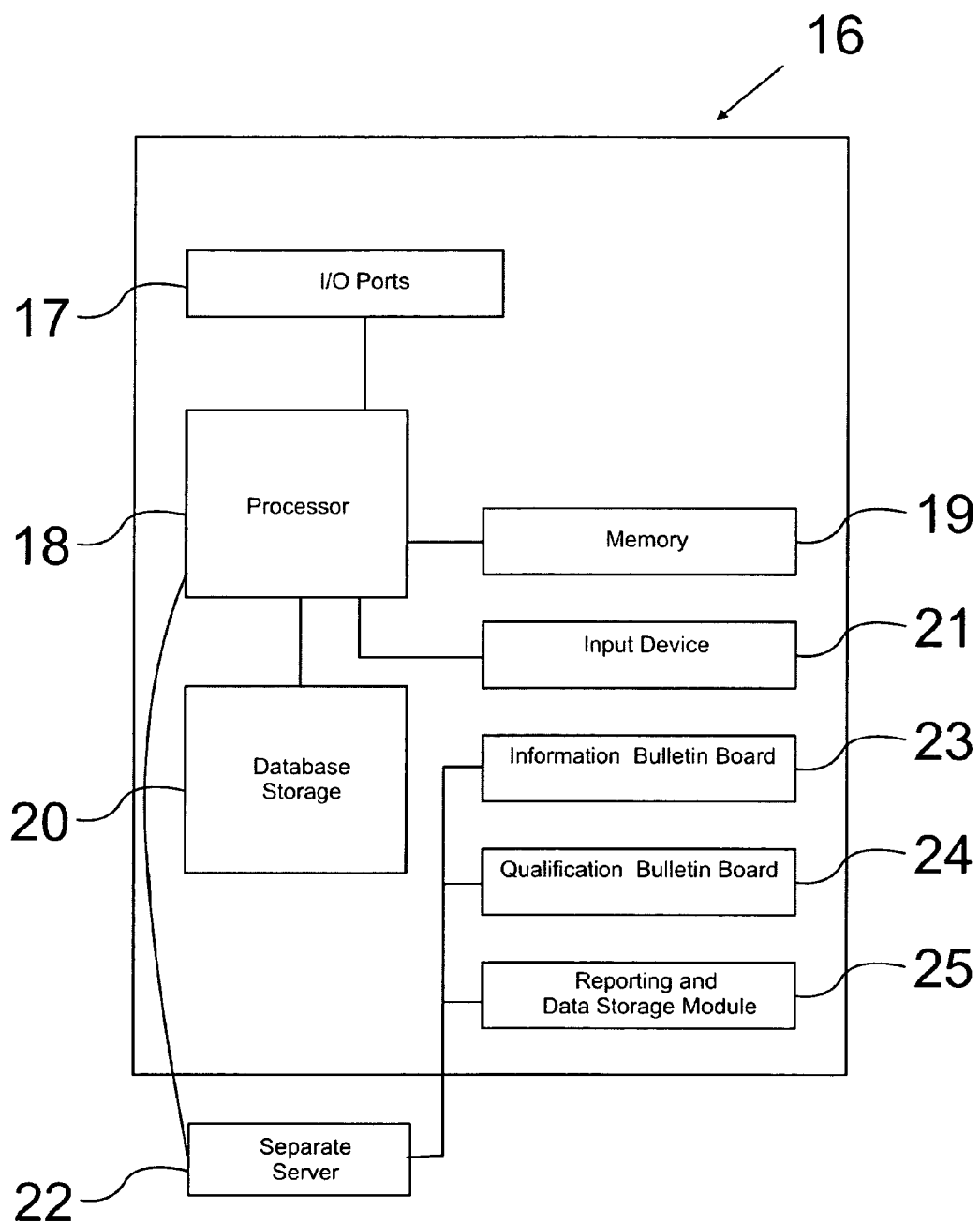
FIG. 2 depicts an embodiment of a database server system usable in the system for acquiring rights to lease a drilling rig.

FIG. 2 depicts an embodiment of the database server system (16) which has I/O ports (17) for connecting to the network, and a processor (18) with memory (19), a database storage (20), and an input device (21) for an administrator of the database server system. A separate server (22) can communicate with the processor (18) for hosting an information bulletin board (23), a qualification bulletin board (24), and a reporting and data storage module (25). The database server system can include one database storage or multiple database storages.

Figure 3:
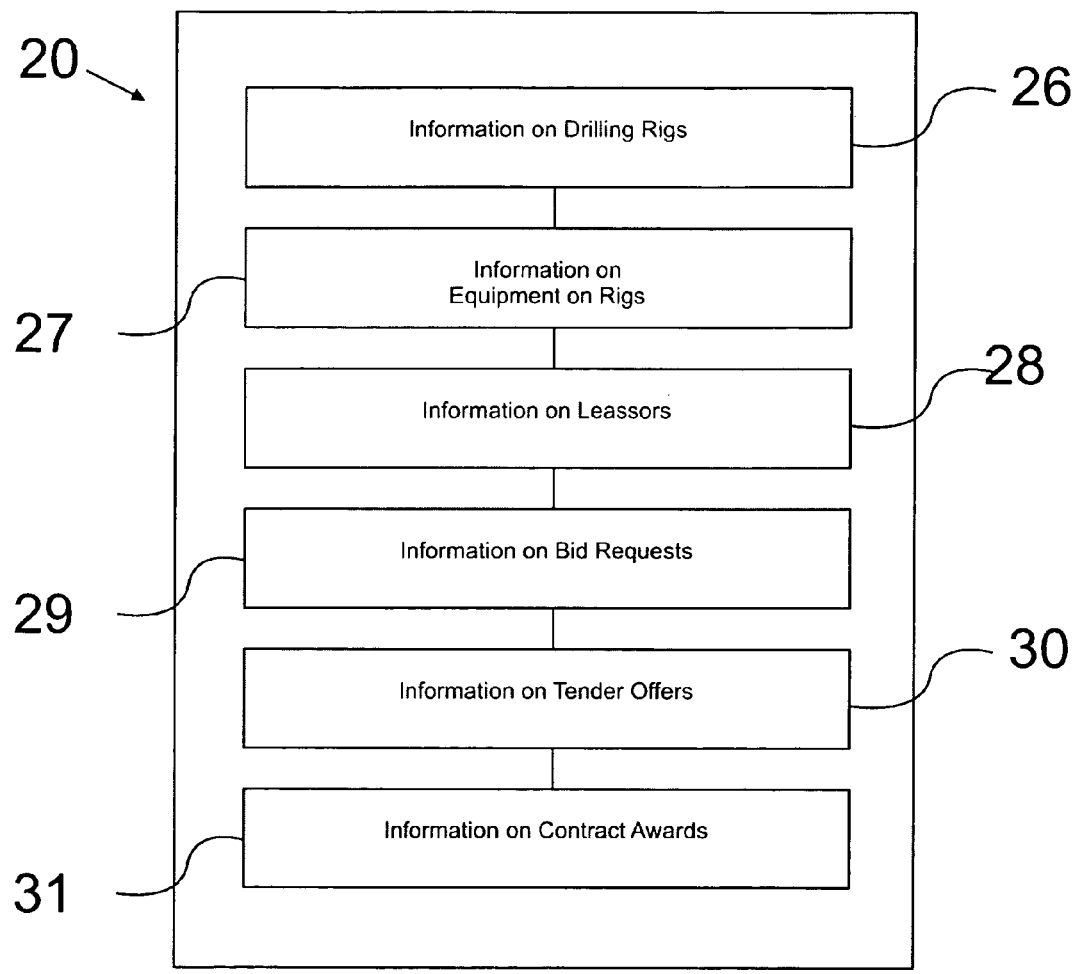
FIG. 3 depicts information in the data storage of an embodiment of the system for acquiring rights to lease a drilling rig.

FIG. 3 depicts the information on a database storage device (20), which includes: information on drilling rigs (26), information on equipment on rigs (27), information on leassors (28), information on bid requests (29), information on tender offers for drilling rig leases (30), and information on contract awards based on tender offers (31). The system contemplates that the information can be displaced over one database storage device or multiple database storage devices.

Figure 4:
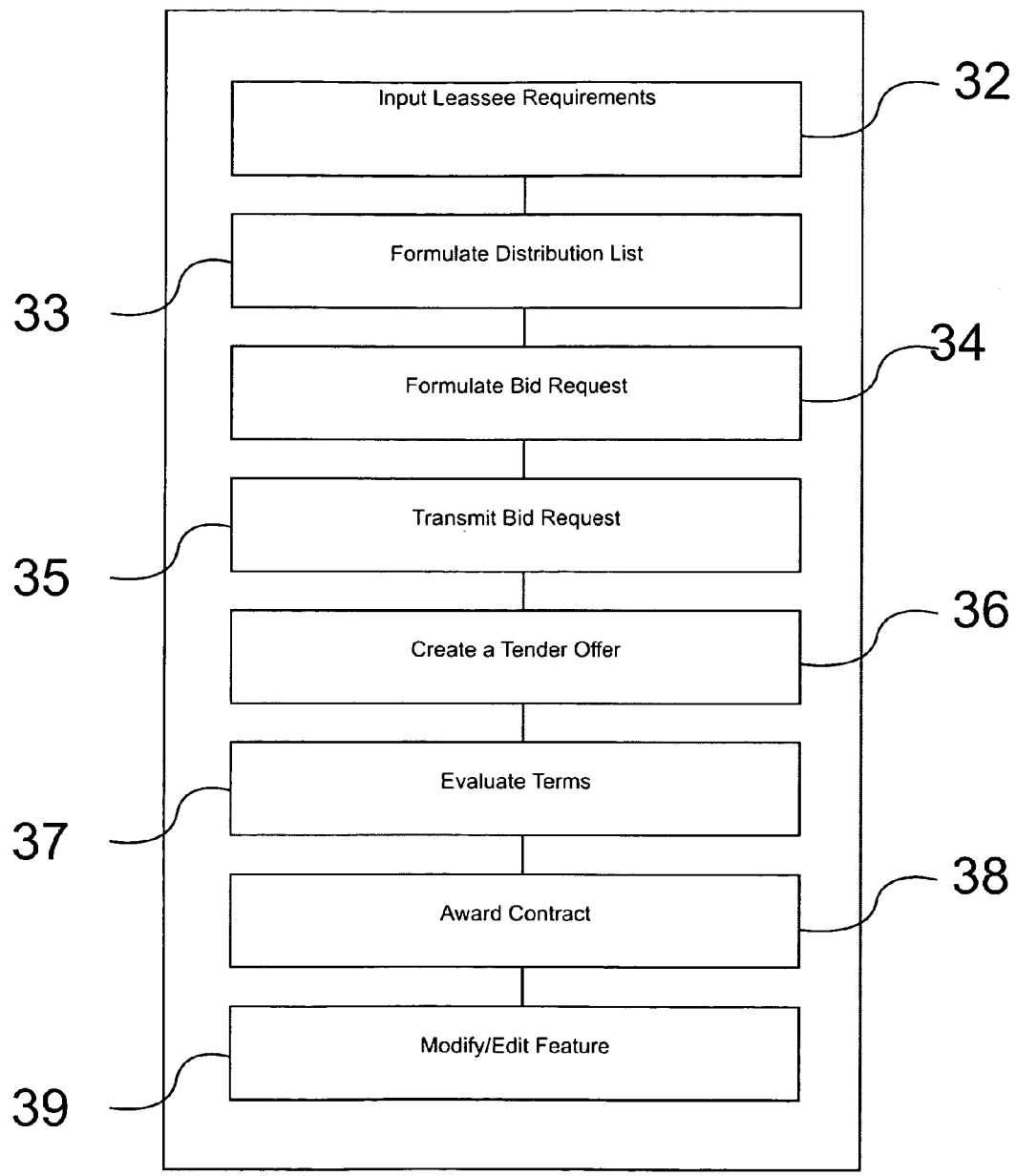
FIG. 4 depicts computer instructions usable in an embodiment of the system for acquiring rights to lease a drilling rig.

FIG. 4 depicts the computer instructions of the computer readable media for the database server system. The computer instructions can be used for: enabling potential leassees to input leassee requirements for a desired drilling rig (32), which can be on a client device and the server system; formulating a leassor distribution list (33) by the potential leassee to receive an invitation to tender an offer; formulating a bid request (34), and transmitting the bid request to each leassor on the leassor distribution list via their respective leassor client devices (35), which is the invitation to develop a tender offer. Additionally, there are computer instructions enabling leassors to use their respective leassor client devices to create tender offers regarding the lease of drilling rigs related to the bid request (36); computer instructions for enabling leassees to determine the best leasing conditions offered by the leassors, which includes evaluating the terms (37); and finally computer instructions to make a contract award (38) to a leassor, which offers the best leasing conditions and most closely matches the bid request. Additional computer instructions to edit or modify (39) the distribution list, technical specifications, bid requests, response to bid requests, tender offer, and final offer can also be within the scope of element.

Figure 5:
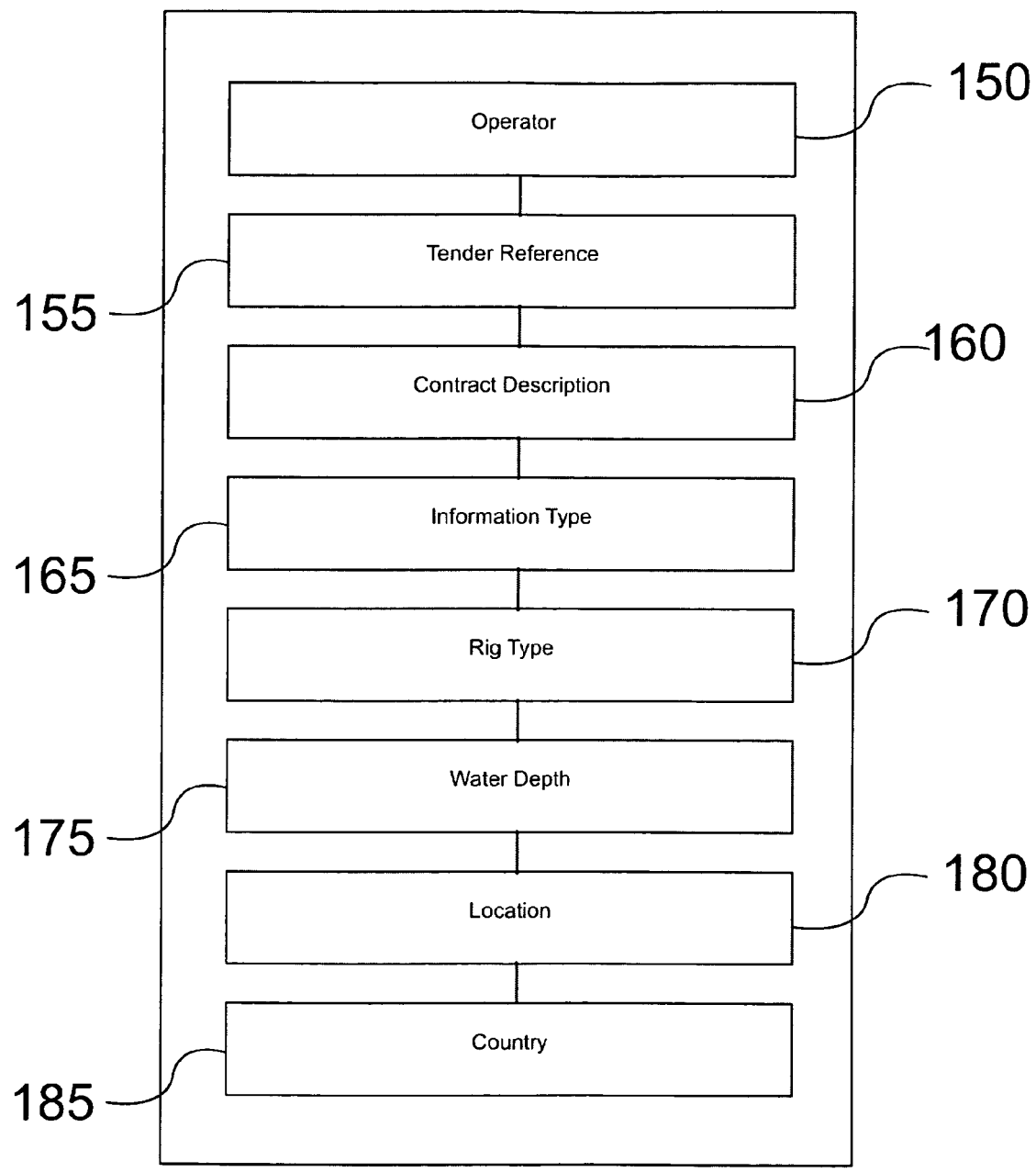
FIG. 5 depicts an embodiment of a secure qualifications bulletin board usable in a system for acquiring rights to lease a drilling rig.

FIG. 5 depicts an embodiment of a secure qualifications bulletin board usable in a system for acquiring rights to lease a drilling rig. A secure qualifications bulletin board can include information for private negotiation and agreement of contract qualifications. The information can begin with the name of the operator for drilling rig operations (150), including the company name or owner of the rig equipment, drilling rig operations. Next, a recording is made of: a tender information reference number (155) followed by a contract description, such as the length of the contract in years (160), and the type of information, such as tender (165). Further, the secure qualifications bulletin board information includes drilling rig type information, such as submersible rigs (170) and water depth for available rig equipment (175). The secure qualifications bulletin board information also includes the location for the drilling rig operations or site (180) and the country for drilling rig operations (185).

Figure 6:
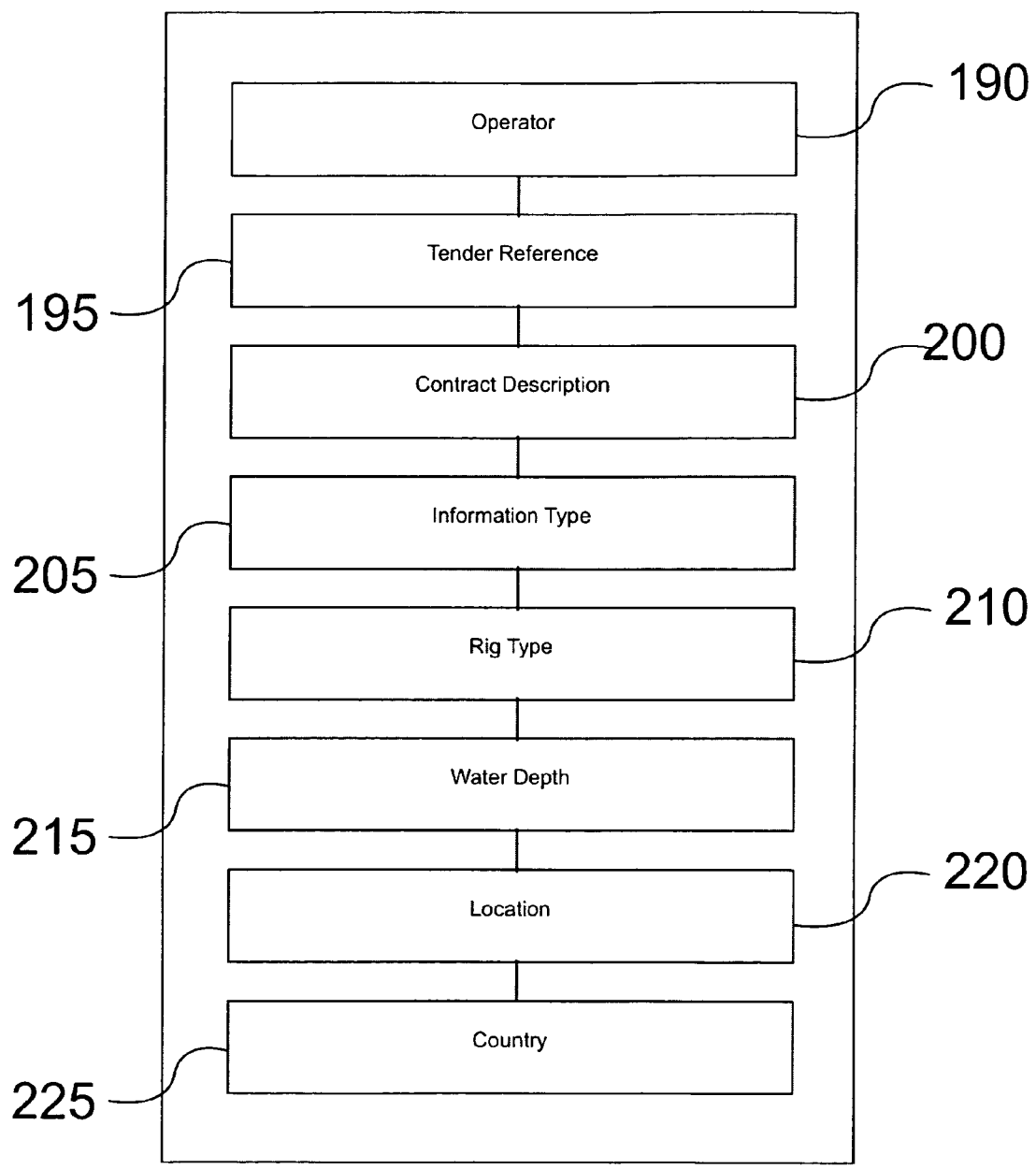
FIG. 6 depicts an embodiment of a secure information bulletin board usable in a system for acquiring rights to lease a drilling rig.

FIG. 6 depicts an embodiment of a secure information bulletin board usable in a system for acquiring rights to lease a drilling rig. The secure information bulletin board can include information for public or private clarification of tender-related issues. The secure information bulletin board information can include clarification of the name of the operator for a type of drilling rig operation (190), the recording and clarification regarding a tender reference number (195), clarification with regard to the contract description for an operator of a drilling rig operation (200), and clarification regarding the type of information offer, such as tender (205). Other information on the secure bulletin board for clarification can include: rig type equipment (210), water depth (215), location of drilling rig operations or site (220) and the country for a drilling rig operation (225).

While these embodiments have been described with emphasis on the embodiments, it can be understood that within the scope of the appended claims, the embodiments might be practiced other than as specifically described herein.

What is claimed is:

1. A system for acquiring rights to lease a drilling rig, wherein the system comprises:
   a. a leassee client device for use by a leassee of the drilling rig;
   b. a leassor client device for use by a leassor of the drilling rig; and
   c. a database sewer system communicating with the leassee client device and the leassor client device, wherein a database sewer system comprises: a processor, a database storage in communication with the processor, I/O ports in communication with the processor for communication with a network, and wherein the database storage comprises:
      i. information in drilling rigs;
      ii. information on bid requests;
      iii. information on tender offers for drilling rig leases; and
   wherein the database sewer system further comprises:
      i. computer instructions enabling potential leassees to specify technical requirements for the drilling rig using a leassee client device;
      ii. computer instructions for formulating a leassor distribution list by the potential leassee to receive an invitation to tender;
      iii. computer instructions for formulating the bid request and transmitting the bid request to each leassor on the leassor distribution list via their respective leassor client devices;
      iv. computer instructions enabling leassors to use their respective leassor client devices to tender offers regarding the lease of drilling rigs related to the bid request; and
      v. computer instructions for enabling leassees to automatically match multiple leasing conditions offered by the leassors including a best commercial fit, a best technical fit, and the availability of the drilling rig, based on the invitation to tender.

2. The system of claim 1, further comprising a network accessible secure qualifications bulletin board to enable leassors with their respective leassor client devices to provide information to a leassee and to receive information from the leassee, wherein the information is selected from a member of the group consisting of: leassee bid document alternatives, leassee bid document exceptions, and combinations thereof.

3. The system of claim 2, wherein the network accessible secure qualifications bulletin board is on a second database server connected to the database server system.

4. The system of claim 2, wherein the network accessible secure qualifications bulletin board further comprises a reporting and data storage module.

5. The system of claim 4, wherein the reporting and data storage module comprises information developed in the system, wherein the information comprises a member selected from the group consisting of: initial bid requests, clarifications requested for the bid process, negotiation information developed during the bid process, final bid request, tender offers, summaries of a leassee's selection process for the drilling rig, and combinations thereof.

6. The system of claim 1, wherein the database storage further comprises a member selected from the group consisting of: information on equipment used on drilling rigs, information on leassors with drilling rigs, and information on awards based on tender offers, and combinations thereof.

7. The system of claim 1, wherein the database server system further comprises computer instructions for making an award to the leassor which offers the multiple leasing conditions that most closely matches the bid request.

8. The system of claim 1, flirt her comprising a network accessible secure information bulletin board to enable leassors to use their respective leassor client devices to request a member selected from the group consisting of: clarification of the bid request, additional information on the bid request, and combinations thereof, and to receive information, clarification, and combinations thereof, from that network accessible secure bulletin board.

9. The system of claim 1, wherein the bid request comprises a link to a secure rig website for leassors to determine interest if the leassor has an interest in the bid request and to download information for review.

10. The system of claim 1, wherein the database sewer system permits the leassee to select operating rates to be addressed by the leassor for the drilling rig.

11. The system of claim 1, wherein the database sewer system permits the leassee to select a member from the group consisting of: insurance requirements required by the leassor for a drilling rig operation, safety requirements for drilling rig operation, and combinations thereof.

12. The system of claim 1, wherein the database sewer system permits the leassee to select contract terms and conditions of a drilling contract.

13. The system of claim 1, wherein the database sewer system permits the potential leassee to select a schedule of responsibilities between the leassor and the leassee for the drilling rig.

14. The system of claim 1, wherein the database sewer system permits the leassor to indicate a list of deficient equipment for the desired drilling rig.

15. The system of claim 1, wherein the bid request addresses a plurality of drilling rigs.

16. The system of claim 1, wherein the database sewer system provides a specified time period for a leassor to reply to a tender offer.

17. The system of claim 1, wherein the database server system enables a plurality of leassees to use their respective leassee client devices to tender a joint offer regarding the drilling rig and the bid request.

18. The system of claim 1, wherein one or more of the leassor client devices and leassee client devices comprise a member selected from the group consisting of: a computer, a personal digital assistant, a cellular phone, a Blackberry™, a satellite phone, a similar communication tool adapted to communicate with the World Wide Web, and combinations thereof.

19. The system of claim 1, wherein the database server system is in communication with the leassee client devices and the leassor client devices using the World Wide Web.

20. The system of claim 1, further comprising computer instructions to edit or modify a member selected from the group consisting of: the distribution list, technical specification, bid request, response to bid request, tender offer and final offer, and combinations thereof.

\* \* \* \* \*